United States Patent [19]

Glass

[11] Patent Number: 5,394,833
[45] Date of Patent: Mar. 7, 1995

[54] ANIMAL WASTE DISPOSAL APPARATUS

[76] Inventor: Thomas W. Glass, 7211 Calumet Rd., Amarillo, Tex. 79106

[21] Appl. No.: 115,984

[22] Filed: Sep. 2, 1993

[51] Int. Cl.⁶ .......................... A01K 1/01; A01K 1/035
[52] U.S. Cl. .................................... 119/166; 209/251; 209/702
[58] Field of Search ................. 119/166; 209/251, 374, 209/375, 417, 634, 662, 680, 702, 707

[56] References Cited

U.S. PATENT DOCUMENTS

| | | |
|---|---|---|
| 3,315,417 | 4/1967 | Roberts . |
| 3,908,597 | 9/1975 | Taylor . |
| 4,886,014 | 12/1989 | Sheriff ................................. 119/166 |
| 5,012,765 | 5/1991 | Naso et al. ............................ 119/166 |
| 5,178,099 | 1/1993 | Lapps et al. .......................... 119/166 |
| 5,186,331 | 2/1993 | Valster ............................. 209/680 X |

Primary Examiner—Robert P. Swiatek
Attorney, Agent, or Firm—Harris, Tucker & Hardin

[57] ABSTRACT

An animal waste disposal apparatus that consists of two cooperating hoppers on a supporting frame separated by an angled screen member so that animal waste is automatically separated from litter material when the apparatus is inverted by rotation. The animal waste is then directed through a chute into a disposable collector so the pet owner does not have to handle an unsanitary litter box. The waste disposal apparatus is fully enclosed to eliminate the unpleasant odor and appearance normally associated with litter boxes and the pet owner does not have to see or handle animal waste.

23 Claims, 3 Drawing Sheets

ANIMAL WASTE DISPOSAL APPARATUS

FIELD OF THE INVENTION

This invention relates to an animal waste disposal apparatus, and more particularly, to an apparatus that functions as an enclosed litter box to eliminate the unpleasant odor and appearance of conventional litter boxes. In addition, the apparatus automatically separates animal waste from otherwise clean litter material and deposits the waste in a disposable collection means.

BACKGROUND OF THE INVENTION

Household pets, especially cats, can be trained to use a litter box which is filled with an absorbent material know as litter. Gravel, sand, and baked clay are commonly used as litter material. Conventional litter boxes generally consist of a relatively flat, open pan that has been filled with a litter material. Because the litter box is not enclosed or covered, the litter box has an unpleasant odor and appearance.

With some regularity, the pet owner must clean the litter box. However, the appearance and odor of animal waste makes the task unpleasant, and it can be physically challenging because most litter boxes are kept on the floor. If the litter box is not cleaned frequently, the odor and appearance of the litter box will worsen, and the, odor will ultimately permeate the litter box and the pet owner's house. If the litter box is not kept clean, the pet will often abandon it.

To clean the litter box, the pet owner must either discard the full contents of the litter box or separate the animal waste from the otherwise clean litter material. If the entire contents are discarded, the cost of maintaining a clean litter box is greatly increased because not all of the litter material has been contaminated. If the pet owner decides to separate the waste from the litter, he must buy a scoop or filtering device. Moreover, the owner must exercise care because the litter box, the filtering device, and the litter material are unsanitary. The litter box should also be given a chance to air out by exposing the empty box to fresh air to dry any remaining moisture and to dissipate any odors. Otherwise, continuous use will cause the odor to permanently saturate the litter box.

Several prior devices have attempted to alleviate the problems associated with litter boxes. For example, U.S. Pat. No. 5,012,765 to Naso et at. discloses an animal waste collection and screening device having two litter pans in opposed orientation with the open face of the first litter pan facing the open face of the second litter pan. A screen member is interposed between the opposing litter pans so that the waste and litter are separated when the apparatus is inverted. The inversion process can be difficult because the pet owner must lift the apparatus by hand and flip it over, and the pet owner must shake or fluff the apparatus to separate the waste from the litter material. After the separation, the pet owner must remove the filtering screen from the apparatus to discard the animal waste. During this final step and when the apparatus is in use as a litter box, the waste is not enclosed, so the apparatus has an unpleasant odor and appearance.

U.S. Pat. No. 3,908,597 to Taylor discloses a litter box that has a central receptacle divided by a partition into dual compartments that may alternatively serve as upper and lower kitty litter areas. Each compartment has its own screened tray to separate animal waste from litter, but the process involves several labor intensive steps. Moreover, the pet owner must handle the screened tray that was buried within the contaminated litter material. Finally, the Taylor device does not enclose the litter material, so the litter box has an unpleasant odor and appearance.

U.S. Pat. No. 4,886,014 to Sheriff discloses a pet litter box that purports to separate reusable litter material from solid pet droppings. The separation is accomplished by a series of tilting and rotating motions that must be followed in a precise manner. Because the apparatus is not supported by a frame, the pet owner must perform the labor intensive task in close proximity to the animal waste, and olfactory contact with offensive odors is likely. Finally, the pet entrance way does not have a door, so the litter box does not contain the animal waste odors when in use.

SUMMARY OF THE INVENTION

The present invention relates to an animal waste disposal apparatus that allows a pet owner to quickly and easily separate animal waste from otherwise clean litter material, and the apparatus conceals the unpleasant odor and appearance normally associated with litter boxes. The apparatus comprises two cooperating hoppers assembled together with a screen member inserted therebetween. When the hopper assembly is vertically disposed, the lower hopper functions as a litter box. The base portion of the lower hopper is filled with litter material, and an aperture allows an animal to enter and exit the hopper. The upper hopper collects waste odors that tend to rise from the lower hopper because of the animal's elevated temperature, but a charcoal filter placed over the upper hopper's aperture prevents the odors from escaping. In addition, fresh air can enter the upper hopper to dry any moisture that may accumulate in the hopper.

The hopper assembly is rotatably mounted on a supporting frame, and the assembly can be easily inverted. The inversion does not require the pet owner to lift or support the hopper assembly, and the pet owner is not exposed to the unpleasant odor and appearance of animal waste because the apparatus is substantially closed. However, the rotation of the hopper assembly in one direction accomplishes several important objectives. First, the animal waste is automatically separated from the otherwise clean litter material as the contents from the previously lower hopper are deposited on the screen member inserted between the hoppers, and the animal waste is directed to a chute that deposits the waste in a disposable collection means. Second, the previously inactive upper hopper is placed in the lower hopper position and filled with filtered litter material. Third, the previously active lower hopper is placed in the upper hopper position to air out. These objectives are obtained without the pet owner touching unsanitary filtering devices, and the unpleasant odor and appearance of the animal waste are concealed at all times.

To aid in odor confinement, the joints between component parts of the hopper assembly fit tightly and doors in each chute can be closed to prevent odors from escaping the apparatus. Urine clumping litter can be used to remove liquid waste as well as solid wastes, so the recycled litter is nearly waste and odor free. The cooperating hoppers taper inwardly toward open top portions which are mated together with a screen or grid member which serves to sift the litter material from the waste. The mated hoppers are like mirror images of each other which have the manufacturing advantage that they are made in the same mold for economical construction.

BRIEF DESCRIPTION OF THE DRAWINGS

For a more complete understanding of the present invention, and for further details and advantages thereof, reference is now made to the following detailed description taken into conjunction with the following drawings, in which.

DETAILED DESCRIPTION OF THE DRAWINGS

Figure 1:
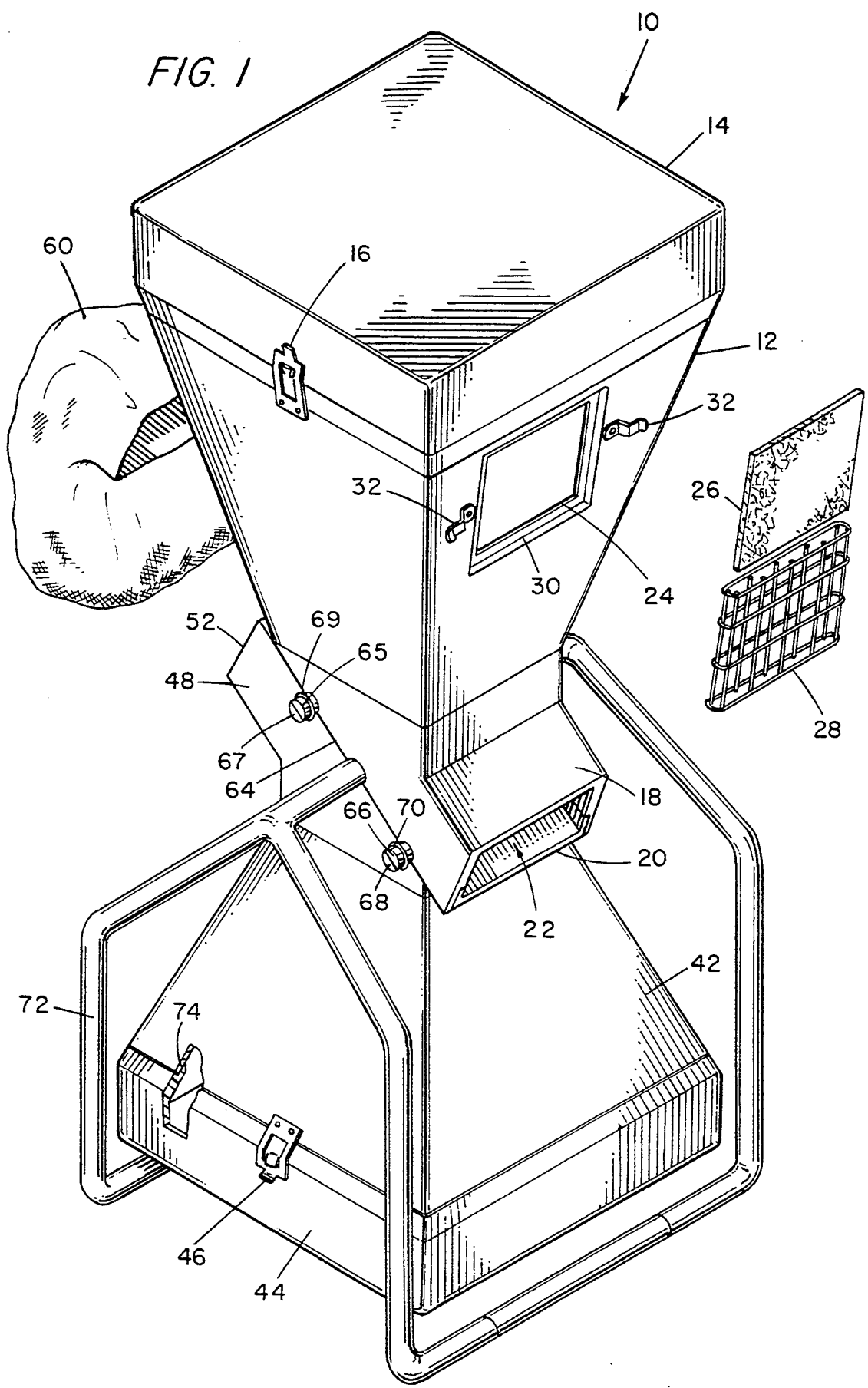
FIG. 1 is perspective view of an animal waste disposal apparatus that has been constructed in accordance with the present invention.

The present invention relates to an animal waste disposal system that overcomes many of the disadvantages found in the prior art. Referring to FIG. 1, animal waste disposal apparatus 10 is shown in perspective view.

Waste disposal apparatus 10 comprises mated hoppers 12 and 42 which are reversibly placed in a vertical orientation. The hopper occupying the lower position functions as a litter box while the hopper in the upper position accumulates rising odors that would otherwise escape a conventional litter box. Screen member 20 is mounted in the opening between first and second hoppers 12 and 42 to separate animal waste from litter material when the vertical positions of hoppers 12 and 42 are reversed by rotation of the assembly on support frame 72. The waste is then directed through one of chutes 22 or 52, whichever is pointed downwardly, and deposited in a disposable collection means 60. Disposable collection means 60 is preferably a small plastic or paper bag, but other collection means can be used. The inversion of the hopper assembly also places filtered litter material into the previously inactive hopper that has been placed into the lower position. The inversion also empties the previously active lower hopper, and positions it in the upper position where fresh air can enter through a charcoal filter. Because frame 72 rotatably supports the hopper assembly, reversing the positions of hoppers 12 and 42 by inversion is easy and quick since the pet owner does not have to lift or support the hopper assembly. Moreover, the process is sanitary because the owner does not have to handle the screen member or the waste and because the unpleasant odor and appearance are concealed within the apparatus at all times.

Waste disposal apparatus 10 comprises a first hopper 12 having a first base portion 14 removably attached with mechanical fasteners 16. The top portion of first hopper 12, disposed oppositely from the base portion 14, is substantially open. The walls of hopper 12 taper inwardly from base portion 14 to the open top portion which is smaller in area than base portion 14. The top portion has a channel-shaped portion 18 extending from first hopper 12 and cooperating with screen member 20 to form a first chute 22. First hopper 12 also includes an aperture 24 in a sidewall that can be covered with a door comprising a charcoal filter 26 within holding member 28. Aperture 24 has a lip 30 and brackets 32 to receive and retain holding member 28.

Waste disposal apparatus 10 further comprises a second hopper 42 constructed identically to first hopper 12. Second hopper 42 has a second base portion 44 held in place by mechanical fasteners 46, and a channel-shaped portion 48 cooperating with screen member 20 to form second chute 52. The top portion of second hopper 42, opposite base portion 44, is substantially open. The walls of second hopper 42 taper inwardly from the base portion 44 toward the open top portion which is smaller in area than base portion 44.

The substantially open top portion of first hopper 12 is mated and attached to the substantially open top portion of second hopper 42 with a resulting interface 64. Screen member 20 is disposed between the mated hoppers 12 and 42 to form a cooperating hopper assembly. The open top portion of first hopper 12 has semicircular extensions 65 and 66 which correspond to similar semi-circular extensions 67 and 68 of the open top portion of second hopper 42. The mated hoppers are held together by fastening rings 69 and 70 which circumvent the mated semicircular extensions. The cooperating hopper assembly is rotatably mounted on frame 72 in a manner that allows the hopper assembly to be inverted by rotation on frame 72. Disposable collection means 60 can be placed on either chute 22 or 52.

Figure 2:
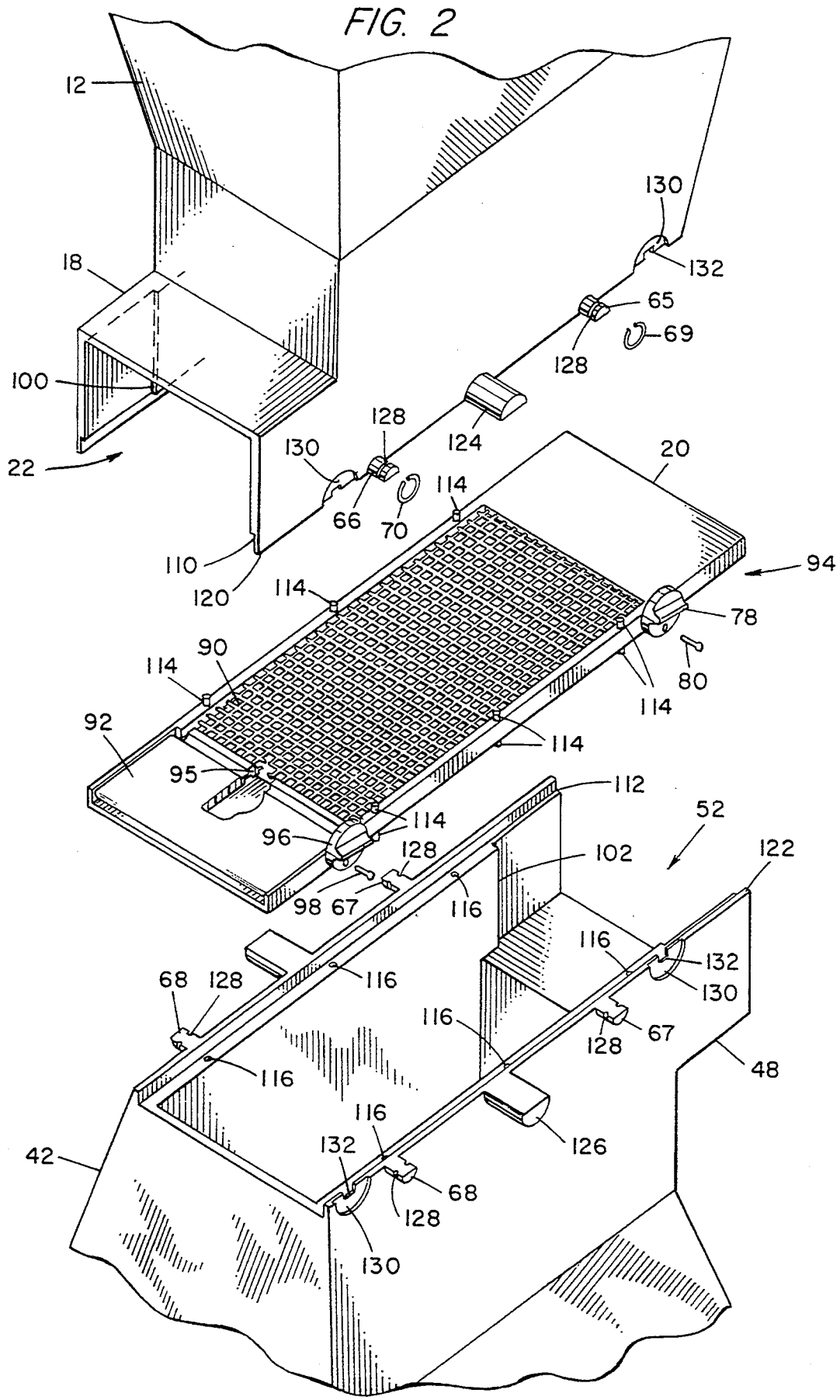
FIG. 2 is an enlarged cutaway perspective view of the animal waste disposal apparatus of FIG. 1 demonstrating the relationship between the hoppers and the screen member.

FIG. 2 is a perspective view showing how the first and second hoppers are attached to form a cooperating hopper assembly. The substantially open top portions of the hoppers are placed adjacent to each other with screen member 20 interposed between the hoppers. Screen member 20 seats on ledge 110 of first hopper 12 and ledge 112 of second hopper 42. Posts 114 extending from screen member 20 are received by corresponding openings 116 suitably spaced on ledges 110 and 112. The top portions of respective hoppers 12 and 42 are defined in part by respective top edges 120 and 122 which are angled with respect to the base portion of the hoppers. With grating member 20 positioned on ledges 110 and 112, the top edge 120 of first hopper 12 mates against the top edge 122 of second hopper 42 as the hoppers are assembled together. This configuration allows semi-circular extensions 65 and 66 of first hopper 12 to cooperate with semi-circular extensions 67 and 68 of second hopper 42 to form cylindrically shaped extensions. The assembly is held together by placing a fastening ring 69 over mated extensions 65 and 67 and placing a fastening ring 70 over mated extensions 66 and 68. A peripheral groove 128 on each semi-circular extension may hold the fastening rings in place. The hopper assembly is further held together as frame 72 rotatably engages a cylindrical extension formed by mating semi-circular extensions 124 and 126 which extend outwardly from the sides of hoppers 12 and 42 near top edges 120 and 122.

Screen member 20 is formed with screen filter portion 90 and solid end portions extending oppositely from the screen portion. The end portions of screen member 20 are formed with chute doors 92 and 94 which can be opened and closed with respective knobs 96 and 78. When they are closed, chute doors 92 and 94 seat against ledges 100 and 102 in the channel-shaped portions 18 and 48 of respective hoppers 12 and 42 in order to form a fight seal, and they are held closed by respective pins 98 and 80. Although not shown, ledges 100 and 102 can be extended across the top surface of channel-shaped portions 18 and 48 to provide a better seal for the chute doors. When chute doors 92 and 94 are open, they are recessed into screen member 20 to provide a smooth surface within the chute in order to prevent any protruding edges which may hinder the sliding removal of animal waste. First and second doors 92 and 94 are attached to screen member 20 by living hinges 95. Hoppers 12 and 42 have semi-circular recessed portions 130 to receive knobs 96 and 78, and recessed portions 130 each have a groove 132 to allow a stem of knobs 96 and 78 to communicate with doors 92 and 94. Knobs 96 and 78 are fixedly connected to the doors such that by rotating the knobs the doors open or close through about a ninety degree arc.

Figure 3:
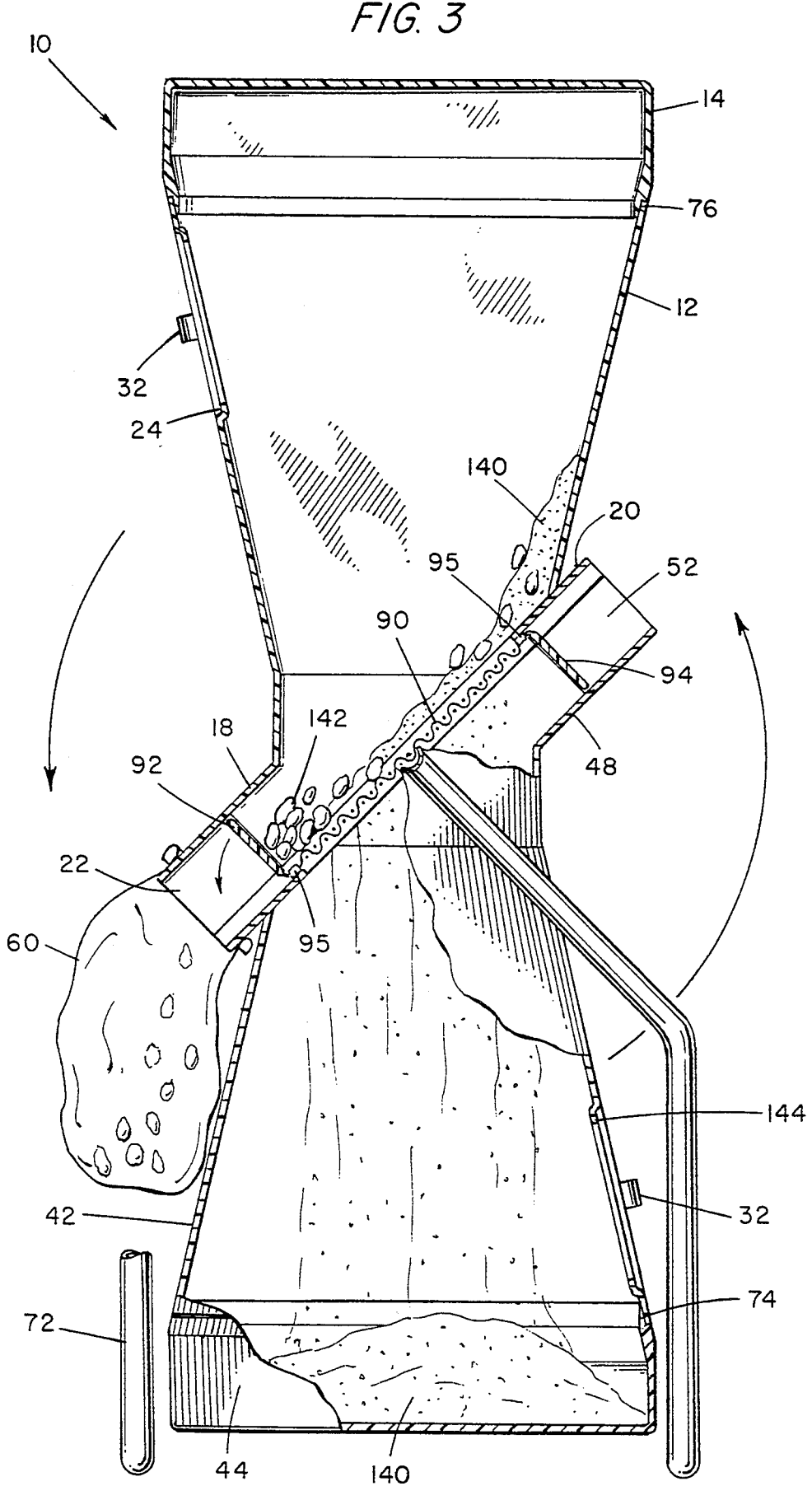
FIG. 3 is a sectional elevational view of the cat waste disposal apparatus looking from the far side of FIG. 1, shown in one of its operating positions.

FIG. 3 shows a sectional view of the animal waste disposal apparatus 10 after having been rotated in the direction of the arrows. A mixture of the litter material 140 and animal waste 142 is on screen member 20. In the position of FIG. 3, litter material 140 can pass through filter portion 90 into lower hopper 42 where it accumulates in lower base portion 44 for reuse. Initially, chute door 92 is closed to allow time for litter material 140 to pass through filter portion 90. Disposable collection means 60 attached to chute 22 receives waste material 142 when chute door 92 is opened. During this operation opposing chute door 94 is also closed to prevent odors from escaping. Aperture 144 allows an animal to ingress and egress hopper 42 when holding member 28 removably covering aperture 144 is removed. The component parts of waste disposal apparatus 10 fit together tightly as shown by joints 74 and 76 located between the base portions and the sidewall of the hoppers to prevent escaping odors.

Referring now to FIGS. 1-3, hoppers 12 and 42 are preferably constructed from identical and interchangeable parts, each having open top and bottom portions. The bottoms of each hopper 12 and 42 are covered by base portions 14 and 44, respectively. The open top portions are adjacent to each other when the hoppers are mated and attached as an assembly. Because both hoppers are identical, they can be made from a single mold. The hoppers are preferably interchangeable, making the animal waste disposal apparatus 10 easy to assemble and disassemble and replacement parts easy to obtain and install. Hoppers 12 and 42 and bottom portions 14 and 44 are preferably made by an injection molding process from any suitable plastic material. Each hopper must be of sufficient size to allow an animal, and more preferably a cat, to enter. The preferred hopper shape is one with a substantially square or rectangular cross-section inwardly tapering walls and a top portion having a smaller opening than the opening where the base portion is attached. However, other hopper designs could be used with this invention. For example, the design could be modified to allow the hoppers to stack easily for packaging or shipping, or the hoppers could have a round or oval cross-sectional shape.

In a variation of the animal waste disposal apparatus to conserve space and to allow positioning the apparatus closer to a wall, the upper hopper can be reduced in size, especially in overall height above the pivot axis where the cooperating hoppers are rotatably mounted on frame 72. The upper hopper in the use position would be reduced in height but still have enough volumetric size to accommodate all of the normal amount of cat litter that would be present in the lower hopper 42. In this variation, the upper hopper could be entirely closed above screen member 20 without having aperture, 24 and without the need for chute 22. The first door 92 of the angled screen 20 could be kept closed or it could be eliminated. The vertical wall of the modified upper hopper leading towards screen 20 could simply be extended to close off against the surface of screen member 20 at the edge of the openings 90. In other words, only the full size hopper would need to have the discharge chute 18 or 48 and the openable door 92 or 94.

The variation is perhaps most easily visualized by reference to the cutaway view of FIG. 2 where the lower hopper 42 is the same as in the original description. However, in the variation, the upper hopper 12 is replaced with a modified hopper which has an opening which mates with unmodified hopper 42 across screen member 20. The mating open end of the modified hopper could be like that shown in FIG. 2, and if so, the door 92 of chute 22 would be left closed. The upper portion of the modified hopper would be shorter and more squat without a removable base portion or any opening into it other than at screen member 20.

A collection means 60 would be placed over the chute 52 as indicated in the position of FIG. 2 and the lower hopper inverted by rotating 180 degrees in a counterclockwise direction over the smaller modified hopper that would receive the litter. Door 94 of hopper 42 would then be opened to allow the separated waste to fall into the collecting bag. The litter would have passed through grill or screen 20 into what had been the upper hopper before inversion. Hopper 42 would be inverted and in the uppermost position. Now the two hoppers could be returned to the original position by rotating them 180 degrees in the clockwise direction whereby the litter would again pass through the angled screen 20 to return for reuse to the same lower hopper from which it came.

In this variation, the animal would always use the same hopper, the modified upper hopper only serving to temporarily hold the litter after it was separated from the waste. Upon returning to the original position, the waste has been removed by the screening operation and the litter returned through the screen to the larger hopper ready for reuse. Because the height of the upper hopper would be reduced, and the rotation is only over a 180 degree arc, the radius or swing are required for the operation is solely dependent on the height of the modified upper hopper. This permits locating the unit closer to a wall and still being able to carry out the waste separating operation. The taller lower hopper always swings away from the wall so its height does not affect the rotation of the device in any way. The smaller upper hopper can be completely enclosed at the top, because it never has to serve as a litter box.

BEST MODE

Base portions 14 and 44 are attached to hoppers 12 and 42 by mechanical fasteners 16. The base portions can be removed to add or remove litter material or to clean the interior portion of the apparatus 10. Any mechanical fasteners known in the art may be used. Hoppers 12 and 42 are held attached together by retaining rings 70 encircling the semi-circular extended portions 65, 66, 67 and 68 and by frame 72 engaging the semi-circular extended portions 124 and 126. Retaining rings 70 are preferably constructed of metal, but any suitable material can be used. Base portions 14 and 44 should have a tight fit against hoppers 12 and 42 to ensure that litter material and animal waste do not inadvertently escape. Therefore, joints 74 and 76 between each hopper and its base portion are preferably formed by overlapping ledges. The interior portions of the joints 74 and 76 are beveled to prevent a build up of litter material as the assembly is repeatedly routed to sift the litter material and remove the waste.

Frame 72 is preferably constructed of tubular material that can be easily assembled or disassembled, but any material can be used that is suitable for a rigid frame. The tubular nature of frame 72 allows it to engage the mated semi-circular extended portions 124 and 126 while permitting rotation. Thus the hopper assembly is supported and balanced at its vertical midpoint making rotation easy. The shape and the size of frame 72 are not critical except that it must support waste disposal apparatus 10 in a manner that allows the hopper assembly to be easily inverted by rotation.

Screen member 20 is disposed between hopper 12 and hopper 42. Screen member 20 has posts 114 which are received by openings 116 found in ledges 110 and 112 running along the top portion of each hopper. Posts 114 assure proper alignment of screen member 20 as well as the proper cooperation of hoppers 12 and 42. With screen member 20 seated on ledges 110 and 112 of the hoppers 12 and 42, the exterior side panels of the hoppers are able to meet in a smooth and continuous joint 154, thereby preventing litter material from leaking between the hoppers.

Preferably screen member 20 is a single injection molded piece with a sufficient rigidity to add to the support of the hopper assembly. As a single molded piece, filter portion 90 is fixed in place and can not be inadvertently dislodged. Chute doors 92 and 94 are integral components of screen member 20 having been formed with living hinge 95. This configuration ensures that chute doors 92 and 94 provide a flat surface flush with the edges of screen member 20 when the doors are open, and that the chute doors properly fit within recessed ledges 100 and 102 of chutes 22 and 52 when the doors are open. Location of the chute doors right at the edge of the screen area of screen member 20 makes it possible to temporarily hold the waste while the litter has time to sift through screen 90. It is usually possible to hear the litter material passing through the screen into the respective base portion of the hopper below. When sufficient time has elapsed for the litter to pass through the screen, the chute door is opened to let the accumulated waste drop into the collection bag. The chute doors could also be mounted to channel-shaped portions 18 and 48 extending from each hopper or be an independently formed piece that can be removably mounted within chutes 22 and 52.

When screen member 20 is properly positioned between hoppers 12 and 42, screen member 20 is disposed at an angle sufficient for the mixture of litter material and animal waste to slide or roll across filter portion 90 without the necessity of shaking or fluffing. Preferably, screen member 20 is disposed at an approximate 45° angle, so it will be at the same angle regardless of which hopper is in the upper position. The 45° angle also maximizes the size of filter portion 90 that would fit within a given space. This not only reduces cost of the screen member but also presents the screen at the most effective angle for efficient screening without overloading the screen. If the entire load of litter were dumped on a flat horizontal screen, it would tend to clog up and require shaking or bumping in order to get the litter to pass through.

The size of openings in filter portion 90 depend upon the size and type of litter material to be used. Preferably, the grating size is sufficient to allow commercially available cat litter to pass through while preventing cat waste from passing through. In addition, if urine clumping litter is used, the urine waste can be filtered out. For example, Sandex Corporation of Houston, Tex. manufactures a urine clumping cat litter sold under the name BETTER WAY® Cat Litter.

Animal waste disposal apparatus 10 has several features to contain the odors normally associated with a litter box. As previously discussed, joint 64 between each hopper and its base portion consists of an overlapping lip, and similarly, the joint between the mated top portions 120 and 122 of each hopper includes ledges 110 and 112 that engages screen member 20. Chute doors 92 and 94, when closed, engage ledges 100 and 102 found within chutes 22 and 52. Apertures 24 and 144 have a recessed lip to tightly engage the door comprising filter 26 and holding member 28. Therefore, the odors normally associated with a liter box are contained within the hopper assembly because the waste is completely enclosed. When chute doors 94 and 96 are closed, they prevent odors from escaping the disposable collection means 60, so odors are contained even if disposable collection means 60 was not replaced after each cleaning. Finally, the pet owner can remove the animal waste more often because of the relative ease of use, so there are fewer odors present.

OPERATION

In order to separate the animal waste from the otherwise clean litter material, the pet owner should close chute doors 92 and 94, and preferably cover both apertures 24 and 144 with the filter and holder which serve as a door panel. A disposable collection means 60 is placed on the upwardly pointing one of chute 22 or 52 to automatically receive the discarded waste when the assembly is inverted. Then, the hopper assembly should be rotated on the frame 72 in a direction so that the mixture of animal waste and litter material falls against the back side of the lower hopper away from the aperture. Rotating the hopper assembly in this direction prevents the mixture from contacting the door panel covering the aperture, so any potential leaks are avoided. The hopper assembly is rotated in this direction for approximately 180°, inverting the assembly. Thus, one hopper is moved from the upper position to the lower position, and the other hopper is moved from the lower position to the upper position.

In FIG. 3, for example, the mixture of animal waste 142 and litter material 140 is deposited on what is now the upper end of screen member 20. As the mixture moves across screen member 20, litter material 140 falls through filter portion 90 and accumulates in the base portion of lower hopper 42. The animal waste 142 continues to move across screen member 20 until it contacts chute door 92. Thus, the rotation of the hopper assembly automatically separates animal waste 142 from litter material 140 and transfers litter material 140 to the lower hopper 42 for reuse. After the litter material has had enough time to fall through the filter portion 90, the chute door 92 is opened to allow the accumulated waste 142 to be removed from the hopper assembly and deposited in disposable collection means 60. If chute door 92 is opened too soon, litter material 140 that could have passed through filter portion 90 could be lost. The pet owner now has several optional steps. He can close chute door 92 to prevent odors from escaping from the hopper assembly and disposable collection means 60. The pet owner may then wish to remove holding member 28 covering lower aperture 144 so that his pet can freely enter and exit the apparatus 10. The pet owner also has the option of removing and disposing of disposable collection means 60 or leaving it in place for the next separation. Finally, the pet owner can remove the base portion of either hopper to further clean the interior of the apparatus 10 or to remove and replace the litter material.

Animal waste disposal apparatus 10 can quickly and easily remove animal waste from litter material. Because the operation is so easy, the pet owner can clean the litter box more often, resulting in a more sanitary litter box. Animal waste disposal apparatus 10 separates animal waste from the litter material without having the pet owner touch the litter box or a screening device. The owner does not have to work with the box at floor level because disposable collection means 60 is positioned substantially above the floor. Finally, the unpleasant smell and appearance associated with animal waste have been contained within the apparatus at all times.

Although preferred embodiments of the invention have been described in the foregoing detailed description and illustrated in the accompanying drawings, it will be understood that the invention is not limited to the embodiments disclosed but is capable of numerous rearrangements, modifications and substitution of parts and elements without departing from the spirit of the invention. Accordingly, the present invention is intended to encompass such rearrangements, modifications and substitutions of parts and elements as fall within the scope of the invention.

I claim:

1. An easily reversible litter box assembly which automatically separates animal waste from litter material and recycles the filtered litter material for reuse, the assembly comprising:
   a) a hopper assembly having first and second cooperating hoppers with an opening between, said hopper assembly having an orientation in which the first and second hoppers are vertically aligned;
   b) a screen member mounted in the opening between said first and second hoppers, said screen member having a plurality of openings sized to separate animal waste from litter material;
   c) a frame rotatably supporting said hopper assembly for rotation into said vertical alignment;
   an operable chute connected to at least one of said hoppers to accumulate said waste so that accumulated animal waste can be removed for disposal,
   e) whereby rotation of said hopper assembly on said frame reverses the positions of said first and second hoppers and automatically separates said animal waste from said litter material, so that said animal waste is accumulated for disposal and said litter material is transferred from one of said hoppers to the other of said hoppers for reuse.

2. The reversible litter box assembly of claim 1 wherein each of said first and second hoppers further comprises an operable chute.

3. The litter box assembly of claim 1 further comprising a disposable collection means mountable on said chute, so that said accumulated animal waste is collected in a sanitary and disposable collection means.

4. The litter box assembly of claim 1 further comprising a pivotal door mounted in said chute which is closeable to ensure that said litter material has sufficient time to pass through said screen member before the accumulated animal waste is removed from said hopper and operable to release said accumulated waste.

5. The litter box assembly of claim 1 further comprising:
   a) a closeable opening on each of said first and second hoppers so that an animal may ingress and egress the opening of a given hopper of said hopper assembly and filtered air can pass through the other hopper of said hopper assembly; and
   b) an odor preventing filter removably attached to said closeable opening to prevent odors.

6. The litter box assembly of claim 5 wherein said odor preventing filter is an activated charcoal filter to absorb odors.

7. The reversible litter box assembly of claim 1 wherein said screen and operable chute are positioned at an angle when said hopper assembly is vertically aligned to automatically cause said accumulated animal waste to move to the lower end of said screen member and chute.

8. The reversible litter box assembly of claim 1 further comprising:
   a) a first and second chute, one chute extending from each of said hoppers so that said accumulated animal waste can be removed for disposal;
   b) wherein said screen member and chutes are positioned at an angle when said hopper assembly is vertically aligned to automatically cause said accumulated animal waste to move to the lower end of said screen member and chute;
   c) a disposable collection means mounted on at least one of said chutes, so that said accumulated animal waste is deposited in a sanitary and disposable collection means;
   d) a first and second pivotal door, one pivotal door mounted in each of said first and second chutes being pivoted to retain litter material to ensure that said litter material has sufficient time to pass through said screen member before the accumulated animal waste is removed from said hopper;
   e) a closeable opening on each of said first and second hoppers so that an animal may ingress and egress the opening of a given hopper of said hopper assembly and filtered air can pass through the other hopper of said hopper assembly; and
   f) an odor preventing filter removably attached to said closeable opening to prevent odors.

9. The reversible litter box assembly of claim 8 wherein said odor preventing filter is a charcoal filter.

10. An easily reversible litter box assembly which automatically separates animal waste from litter material, accumulates the waste for disposal, and recycles the filtered litter material, the assembly comprising:
   a) a hopper assembly having an upper and lower hopper with an opening there between, said upper hopper vertically disposed over said lower hopper, whereby said lower hopper functions as a litter box;
   b) a support means for rotatably supporting said hopper assembly so that the positions of said upper and lower hoppers can be reversed by rotating said hopper assembly on said support means; and
   c) a separating means mounted in said opening between said upper and lower hoppers for separating animal waste from litter material, so that rotation of said hopper assembly on said support means simultaneously empties the contents of the previously lower positioned hopper onto the separating means, moves the previously lower positioned hopper to the upper position, moves the previously upper positioned hopper to the lower position, separates animal waste from litter material, and deposits filtered litter material in the hopper newly positioned in the lower position for reuse;

d) a closeable opening on each of said upper and lower hoppers so that an animal may ingress and egress the opening of a given hopper of said hopper assembly and filtered air can pass through the other hopper of said hopper assembly.

11. The reversible litter box assembly of claim 10 wherein said upper and lower hoppers further comprise chutes associated with said separating means so that said accumulated animal waste can be removed for disposal by opening one of said chutes.

12. The litter box assembly of claim 11 further comprising two pivotal doors, one pivotal door mounted in each of said chutes being closeable to ensure that said litter material has sufficient time to pass through said separating means before the accumulated animal waste is removed from said hopper by opening one of said doors.

13. The litter box assembly of claim 11 wherein said separating means is a screen member having a multiplicity of holes sized to allow litter material pass through while restricting the passage of animal waste.

14. The litter box assembly of claim 13 wherein said screen is positioned at an angle of approximately forty-five degrees to the vertical wherein one of said hoppers is vertically disposed over the other.

15. The litter box assembly of claim 10 further comprising:
an odor preventing filter removably attached to one of said closeable openings to prevent odors.

16. The litter box assembly of claim 10 wherein said support means is a frame constructed of tubular components.

17. An easily reversible litter box assembly which automatically separates animal waste from litter material, accumulates waste for disposal and recycles the filtered litter material for reuse, the assembly comprising:
a) a mated cooperating first and second opposed hoppers having an angled opening therebetween, so that litter material may pass between said hoppers;
b) a screen member mounted in said angled opening between said first and second hoppers having a multiplicity of openings sized to separate animal waste from litter material, so that animal waste may not pass between said hoppers; and
c) a frame rotatably supporting said first and second hoppers whereby rotation of first and second hoppers on said frame removes litter material from the previously active hopper, transfers accumulated animal waste and litter to said screen member, accumulates animal waste above said screen member and deposits the filtered litter material below said screen member into the newly active hopper for reuse.

18. The reversible litter box assembly of claim 17 wherein said first and second hoppers include chutes to transfer said accumulated animal waste from said screen member to a disposable collection means attachable at said chutes.

19. The litter box assembly of claim 18 further comprising two pivotal doors, one pivotal door mounted in each of said chutes being closable to ensure that said litter material has sufficient time to pass through said screen member before the accumulated animal waste is removed from said hopper and being operable to allow said waste to be transferred from a chute in which it has been accumulated.

20. The litter box assembly of claim 19 wherein the chutes of the first and second hoppers are oppositely directed so that litter material and animal waste fall away from the chute of the active hopper when the first and second hoppers are rotated on the frame and the animal waste and litter material must travel across the screen member before reaching the chute.

21. The litter box assembly of claim 20 further comprising:
a) a closeable opening on each of said first and second hoppers so that an animal may ingress and egress the opening of a given hopper of said hopper assembly and filtered air can pass through the other hopper of said hopper assembly; and
b) an odor preventing filter removably attached to said closeable opening to prevent odors.

22. A method of using an animal litter box having an upper and lower cooperating hoppers with a screen member disposed therebetween at an approximate 45° angle, at least one hopper comprising a chute, a pivotal door mounted within said chute, and an aperture, said cooperating hopper assembly rotatably mounted on a frame, wherein said method comprises:
a) closing said pivotal door within said chute;
b) attaching a disposable collection means on said chute of said at least one hopper;
c) rotating said hopper assembly in one direction on said support whereby said cooperating hopper assembly is inverted and said upper and lower hoppers are reversed and any animal waste accumulates on said screen member as the filtered litter material passes through to the lowest hopper; and
d) opening said pivotal door in said chute of the upper hopper after rotating said hopper assembly and after attaching said disposable collection means whereby said animal waste is deposited in said disposable collection means.

23. The method of claim 22 further including the step of returning said cooperating hoppers to the uninverted position by rotating said hopper assembly in an opposite direction whereby the litter material again passes through said screen member and returns to the hopper from whence it came for reuse.

* * * * *